O. R. SCHOENROCK.
WHEEL RIM SECURING MEANS.
APPLICATION FILED OCT. 15, 1908.

955,213.

Patented Apr. 19, 1910.
3 SHEETS—SHEET 1.

Witnesses
C. L. Hopkins
M. L. Farrar

Inventor
Otto R. Schoenrock
By Jones, Addington & Ames,
Attorneys

O. R. SCHOENROCK.
WHEEL RIM SECURING MEANS.
APPLICATION FILED OCT. 15, 1908.

955,213.

Patented Apr. 19, 1910.
3 SHEETS—SHEET 2.

Witnesses
C. L. Hopkins
M. L. Farner

Inventor
Otto R. Schoenrock
By Jones, Addington & Ames
Attorneys.

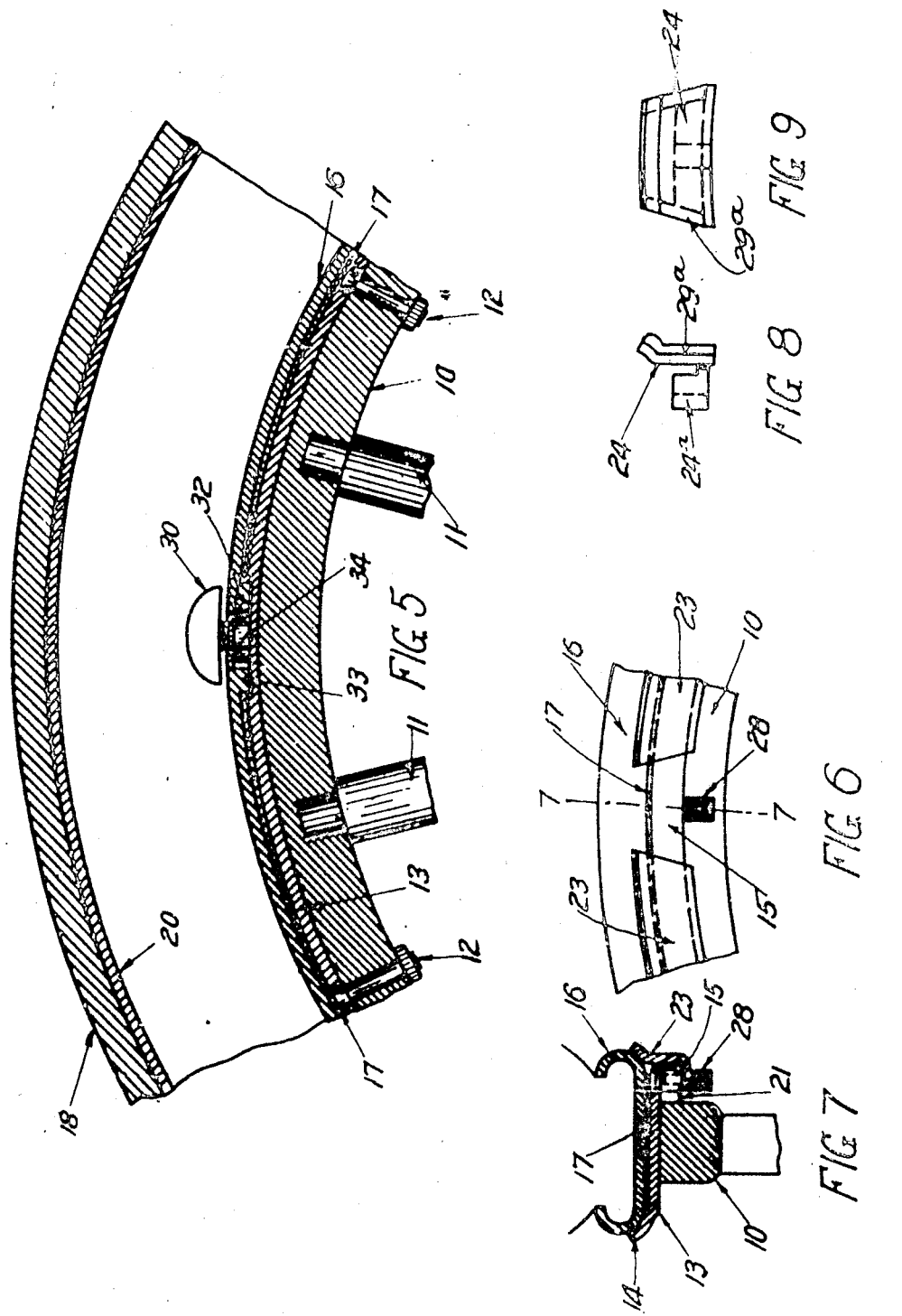

UNITED STATES PATENT OFFICE.

OTTO R. SCHOENROCK, OF CHICAGO, ILLINOIS.

WHEEL-RIM-SECURING MEANS.

955,213.  Specification of Letters Patent.  Patented Apr. 19, 1910.

Application filed October 15, 1908. Serial No. 457,948.

*To all whom it may concern:*

Be it known that I, OTTO R. SCHOENROCK, a citizen of the United States, residing at No. 1704 West North avenue, Chicago, in the county of Cook and State of Illinois, have invented new and useful Improvements in Wheel-Rim-Securing Means, of which the following is a full, clear, concise, and exact description, reference being had to the accompanying drawings, forming a part of this specification.

This invention relates to improvements in means for securing pneumatic or other tires to wheel rims.

The object of the invention is to provide means for securing the tire to the wheel which are so arranged that the tire and rim can be removed together instead of, as is ordinarily done, removing the tire only and leaving the rim in place on the wheel. By this new method time is saved when it becomes necessary to change the tire, as the rim with the inflated tire thereon may be carried ready for application to the wheel at any time.

Figure 1:
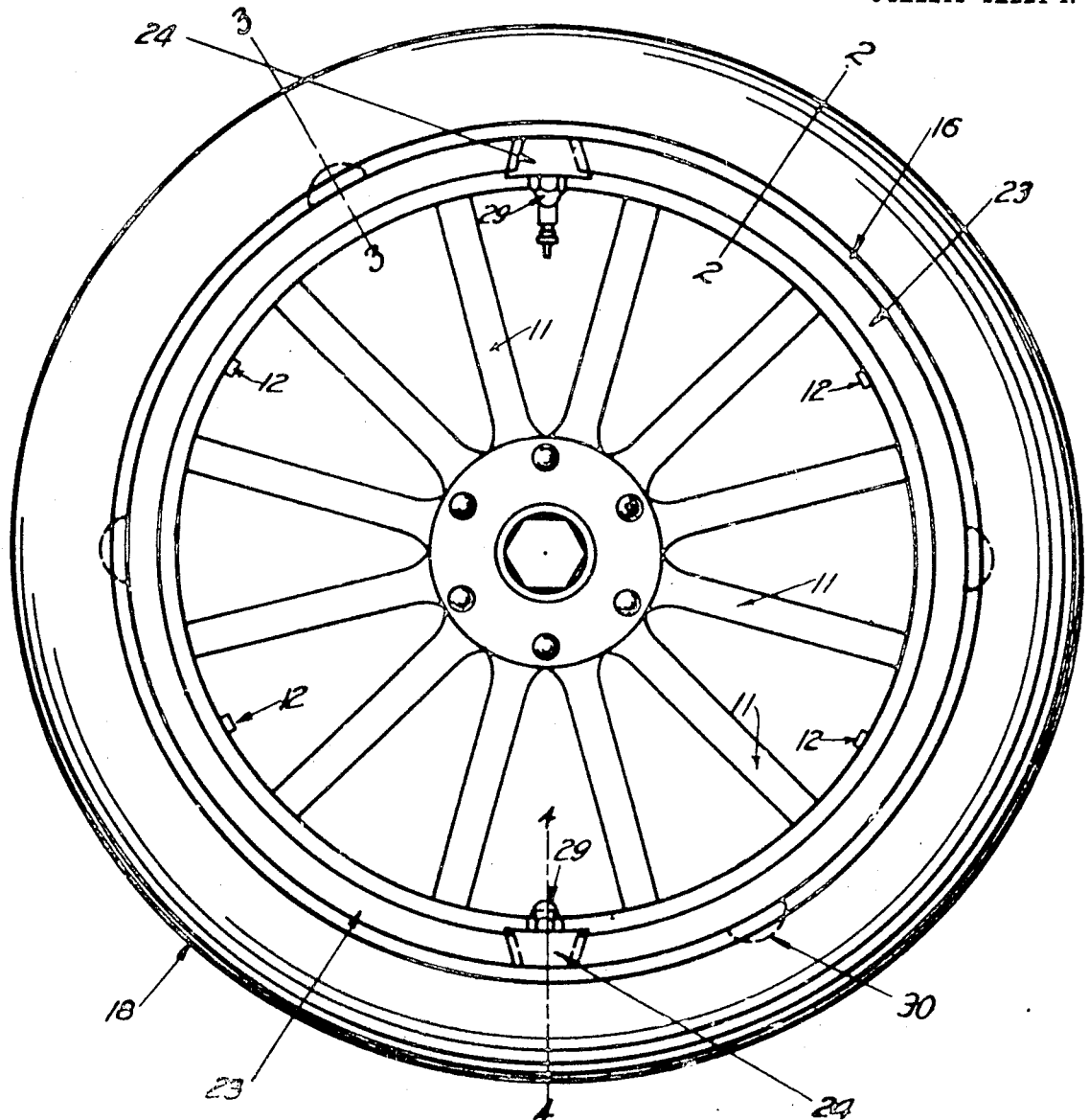
Figure 2:
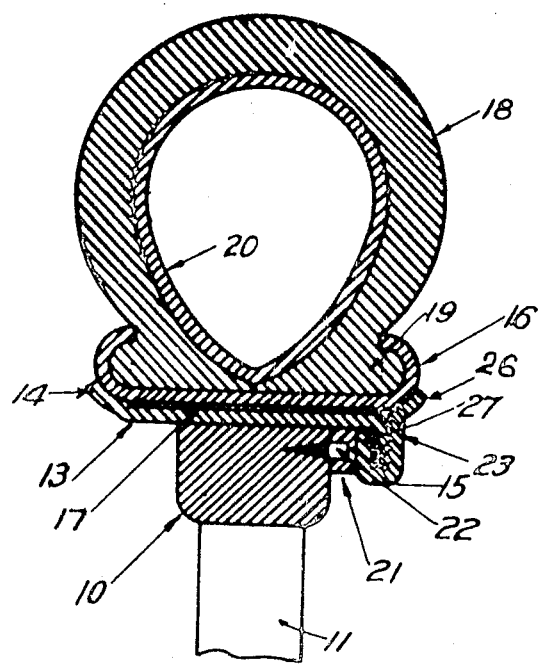
Figure 3:
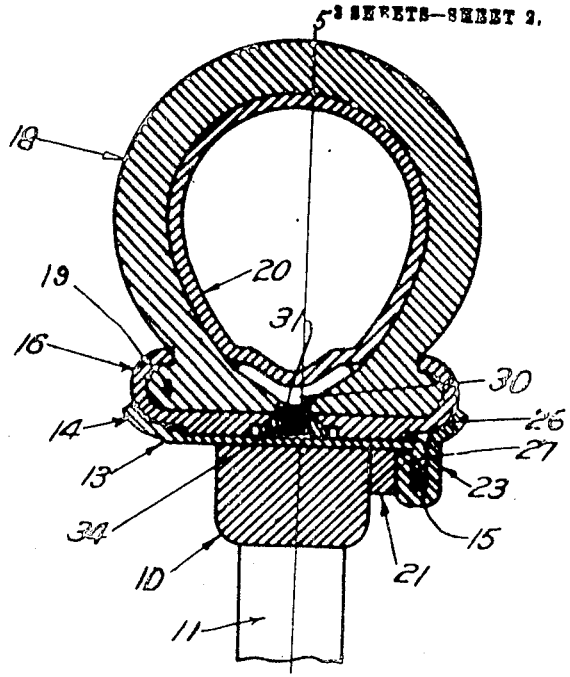
Figure 4:
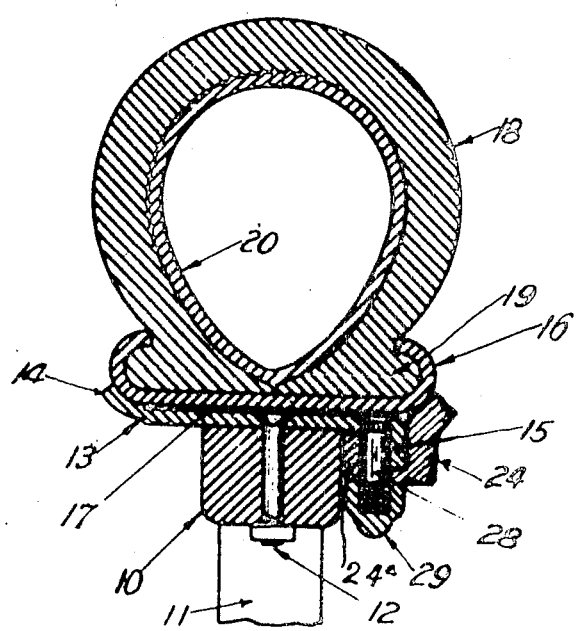

In the accompanying drawings, Figure 1 is a side elevational view of a wheel fitted with the clencher tire, the latter being attached in place by means of the device forming the subject of my invention; Figs. 2, 3 and 4 are cross sectional views on the correspondingly numbered lines of Fig. 1; Fig. 5 is a central longitudinal section through a part of the wheel rim and tire, the section being taken on the line 5—5 of Fig. 3; Fig. 6 is a fragmentary side elevational view of the felly of the wheel with parts of the tire-securing means in place thereon; Fig. 7 is a cross sectional view of the same on the line 7—7 of Fig. 6; and Figs. 8 and 9 are end and side views respectively of a locking wedge member which is applied after the parts shown in Figs. 6 and 7 are in position.

In the several figures of the drawings like reference characters refer to the same parts throughout.

In the drawings, 10 is the felly of the wheel, 11, 11, etc. being the spokes thereof. Secured to the felly by means of bolts 12 is an inner rim 13 which extends continuously around the wheel and is provided on one edge with an outturned portion 14 and on its opposite edge with an inturned portion 15. Outside the inner rim 13, and between it and the outer or clencher rim 16, is arranged a strip 17 of non-corrodible material, such as vulcanized fiber or the like. This strip is preferably secured in place, either by riveting or by means of cement or the like. The tire 18 is provided with beads 19 as usual, by means of which the tire is held in place when the same is inflated. Within the tire is the usual inner tube 20.

Secured to the side of the felly 10 is a ring 21 made in two pieces and arranged with the approaching ends thereof slightly separated. These half rings are secured to the side of the felly by means of screws 22 placed at intervals therearound. These half rings lie between the downturned edge 15 of the inner rim 13 and the side of the felly. Extending around the inner rim is a ring 23, made in separable halves, having their ends inclined, as shown in Fig. 6, and between the approaching ends of these half rings are placed wedge blocks 24 by means of which the ring 23 is expanded. The ring 23 rests, at its upper edge 26, against the outer or clencher rim 16 and its lower edge is turned inwardly and outwardly at 27 behind the downturned edge 15 of the inner rim. The wedge blocks 24 are also formed with portions 24ᵃ extending inwardly and outwardly behind the edge 15 of the inner rim 13. To force the wedge blocks 24 into position and thus expand the ring 23, bolts 28 extend through suitable apertures in the inner rim and the wedge blocks, these bolts having nuts 29, by the removal of which the wedge blocks may be detached and the ring 23 loosened. When these wedge blocks are removed the ring 23 may be readily taken off by springing the ends of the two halves inwardly. The wedge blocks 24 are formed with lips 29ᵃ which overlap the ends of the halves of the ring to prevent lateral movement of these ends.

At intervals around the wheel are provided suitable tire clamps 30, these clamps having threaded portions 31 extending through the clencher rim into recesses 32 formed therein, the metal of the clencher rim being thickened at the points where these clamps occur, as at 33 in Fig. 5. The recesses are occupied by nuts 34 which screw on the threaded ends of the clamps 30. These clamps 30 prevent the creeping of the tire around the rim. The inner rim is formed with depressions or recesses in its upper surface into which extend the thickened portions of the clencher rim, whereby the clencher rim is prevented from creeping around the inner rim.

In devices of this class, as usually constructed, when it becomes necessary to remove the tire and replace the same with another tire it has been necessary to deflate the tire which is to be removed before it can be detached from the clencher rim. After the new tire was in position it was then necessary to inflate the same before the vehicle could proceed. By means of the improved device herein shown a change of tires may be very quickly made, as the tire and the clencher rim are removed together and quickly replaced by another rim with an inflated tire thereon. To effect the removal of the tire it is only necessary to take off the nuts 29, whereupon the wedge blocks 24 may be removed. By springing the ends of the two halves of the ring 23 together these pieces may now be taken off, after which the clencher rim may be drawn off the inner rim with the tire in place thereon. After a new clencher rim and tire have been substituted for the one removed, the two halves of the ring 23 may be replaced and the wedge blocks 24 secured in position by the nuts 29. The clencher rim is then securely embraced between the outturned portion 14 on the inner rim 13 and the upper edge of the ring 23.

Having thus described my invention, what I claim as new and desire to secure by Letters Patent, is:

1. The combination with the felly of a wheel, of an outer rim, a resilient tire secured thereto, an inner rim having an outturned edge and an inturned edge, a split ring having a groove for the reception of the inturned edge of said inner rim and having a flange adapted to engage said outer rim, a ring secured to said felly between said split ring and said felly, and a wedge for expanding said split ring, said second-named ring having a portion thereof cut away to accommodate said wedge.

2. The combination with the felly of a wheel, of an outer rim and means for retaining the same in position, said means comprising an inner rim and a broken ring arranged to embrace said outer rim between themselves, said inner rim having an inwardly turned edge, said ring having a groove adapted to receive the inturned edge of said inner rim when the ring is expanded, and a wedge for expanding said ring, said wedge having edges arranged to overlap the approaching ends of the ring.

In witness whereof, I have hereunto subscribed my name in the presence of two witnesses.

OTTO R. SCHOENROCK.

Witnesses:
T. W. L. FARRAR,
CHAS. L. HOPKINS.